United States Patent [19]
Mashiki

[11] Patent Number: 6,041,755
[45] Date of Patent: Mar. 28, 2000

[54] APPARATUS AND METHOD FOR REDUCING TORQUE FLUCTUATION FOR LEAN BURN COMBUSTION ENGINE

[75] Inventor: Zenichiro Mashiki, Toyota, Japan

[73] Assignee: Toyota Jidosha Kabshiki Kaisha, Toyota, Japan

[21] Appl. No.: 08/991,544

[22] Filed: Dec. 16, 1997

[30] Foreign Application Priority Data

Dec. 19, 1996 [JP] Japan .................................. 8-339784

[51] Int. Cl.⁷ ................................................ F02D 43/04
[52] U.S. Cl. ....................................................... 123/406.29
[58] Field of Search ........................... 123/406.29, 406.21

[56] References Cited

U.S. PATENT DOCUMENTS 4,315,492  2/1982  Gardner ............................. 123/406.29

FOREIGN PATENT DOCUMENTS 60-52304  11/1985  Japan .
4-187851   7/1992  Japan .
4-325752  11/1992  Japan .
4-353243  12/1992  Japan .

*Primary Examiner*—Andrew M. Dolinar
*Attorney, Agent, or Firm*—Oliff & Berridge, PLC

[57] ABSTRACT

An apparatus for reducing a torque fluctuation of a lean burn combustion engine. An injector supplies fuel to combustion chambers of the engine. An ignitor ignites the fuel supplied into the combustion chambers. A knock sensor detects knocking in the engine. An electronic control unit (ECU) computes a delay amount of the ignition timing based on a result of knock detection by the knock sensor and controls the ignitor to delay the ignition timing by the delay amount to suppress knocking. The ECU also detects torque fluctuation of the engine. The ECU increases an amount of fuel injection from the injector by an increase amount to reduce the torque fluctuation when the detected torque fluctuation is larger than a target value. The ECU limits the increase amount when the ignition timing is delayed by more than a predetermined delay amount.

18 Claims, 6 Drawing Sheets

APPARATUS AND METHOD FOR REDUCING TORQUE FLUCTUATION FOR LEAN BURN COMBUSTION ENGINE

BACKGROUND OF THE INVENTION

The present invention relates to an apparatus and method for reducing a torque fluctuation of an engine, and, more particularly, to an apparatus and method for reducing the torque fluctuation of the engine that can be used for stratified charge combustion in an engine such as a cylinder injection type engine.

In a typical engine, fuel is injected into an intake port from a fuel injection valve to charge a homogeneous mixture of fuel and air to the associated combustion chamber. An intake passage is opened and closed by a throttle valve, which is operated by manipulating an acceleration pedal. The opening of the throttle valve adjusts the intake air amount (and ultimately the amount of homogeneously mixed air and fuel) that is supplied to the combustion chambers of the engine. This controls engine power.

However, when performing homogeneous charge combustion, vacuum is produced by the throttling action of the throttle valve. This increases energy loss due to pumping, which results when the mixture is drawn into the combustion chamber from the intake port. To attempt to solve this problem, stratified charge combustion has been proposed. In stratified charge combustion, the throttle valve is opened wide, and fuel is supplied directly into each combustion chamber. This provides a mixture having a relatively low air-fuel ratio in the vicinity of the ignition plug. As a result, the fuel is easier to ignite.

"Lean burn combustion" includes "stratified charge combustion". "Lean burn combustion" includes not only "stratified charge combustion" but also "homogeneous lean burn combustion," which improves fire propagation with less fuel by forming a swirl or the like in the air-fuel mixture during homogeneous charge combustion. "Stratified charge combustion" and "lean burn combustion" both reduce the amount of fuel supplied to the combustion chambers.

In an engine that performs the aforementioned "lean burn combustion," abnormal combustion due to the self firing of fuel, knocking, may occur. To suppress knocking, the ignition timing is delayed. Delaying the ignition timing, however, reduces the fuel combustion speed, which deteriorates combustion and increases the torque (power) fluctuation of the engine.

For example, Japanese Unexamined Patent Publication No. Hei 4-187851 discloses an apparatus designed to overcome this drawback. This apparatus increases the amount of fuel injection in accordance with the amount of delay when the ignition timing is delayed. The increased amount of fuel injection suppresses the deterioration of the combustion and reduces an increase in torque fluctuation.

When the fuel injection amount is increased, however, the disclosed apparatus increases the likelihood of knocking. To suppress knocking, therefore, the ignition timing should be delayed further. This may result in an over-delay of the ignition timing, which may cause a misfire. Such a misfire would further increase the torque fluctuation.

SUMMARY OF THE INVENTION

Accordingly, it is an objective of the present invention to provide a torque fluctuation reducing apparatus for a lean burn combustion engine, which can reduce torque fluctuation without raising a shortcoming associated with a delayed ignition timing.

To achieve the above objective, the present invention provides an apparatus for reducing a torque fluctuation of a lean burn combustion engine, comprising an injector for supplying fuel to combustion chambers of the engine; an ignitor for igniting the fuel supplied into the combustion chambers; a knock detector for detecting knocking in the engine; an ignition timing controller for computing a delay amount of the ignition timing based on a result of knock detection by the knock detector and for controlling the ignitor to delay the ignition timing by the delay amount to suppress knocking; a torque fluctuation detector for detecting torque fluctuation of the engine; a fuel injection controller for increasing an amount of fuel injection from the injector by an increase amount to reduce the torque fluctuation when the detected torque fluctuation is larger than a target value; and a limit device for limiting the increase amount when the ignition timing is delayed by more than a predetermined delay amount.

The present invention further provides an apparatus for reducing a torque fluctuation of an internal combustion engine which performs lean burn combustion, comprising: an exhaust gas recirculating mechanism for recirculating a gas into an intake passage from an exhaust passage of the engine, the mechanism including an exhaust gas recirculating passage for connecting the exhaust passage of the engine to the intake passage, a valve disposed in the exhaust gas recirculating passage, and an actuator for opening and closing the valve; a condition detector for detecting a running condition of the engine; a recirculating computer for computing an amount of exhaust gas recirculation based on the detected running condition, and controlling the actuator based on the amount of exhaust gas recirculation; an ignitor for igniting the fuel supplied into combustion chambers of the engine; a knock detector for detecting knocking in the engine; an ignition timing controller for computing a delay amount of the ignition timing based on a result of knock detection by the knock detector and for controlling the ignitor to delay the ignition timing by the delay amount to suppress knocking; and a compensation controller for reducing the amount of exhaust gas recirculation in accordance with the computed delay amount.

The present invention provides a method of reducing the torque fluctuation of a lean-burn internal combustion engine, comprising the steps of: detecting whether knocking has occurred in the engine: detecting the torque fluctuation of the engine; increasing an amount of fuel injection by an increase amount to reduce the torque fluctuation when the detected torque fluctuation is larger than a target value; delaying the ignition timing based on the outcome of the knock detection step; and limiting the increase amount when the ignition timing is delayed more than a predetermined delay amount.

The present invention further provides a method of reducing the torque fluctuation of a lean-burn internal combustion engine, the method comprising the steps of: detecting a running condition of the engine; computing a target amount of exhaust gas recirculation based on the detected running condition; controlling the amount of exhaust gas recirculation based on the target amount; detecting whether knocking has occurred in the engine; computing a delay amount for delaying the ignition timing of the engine based on the outcome of knock detection step; delaying the ignition timing by the delay amount; and reducing the amount of exhaust gas recirculation in accordance with the delay amount.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings.

DETAILED DESCRIPTION OF THE PREFERRED EMBODIMENTS

First Embodiment

An torque fluctuation reducing apparatus for a lean burn combustion engine according to a first embodiment of the present invention will specifically be described below referring to the accompanying drawings.

Figure 1:
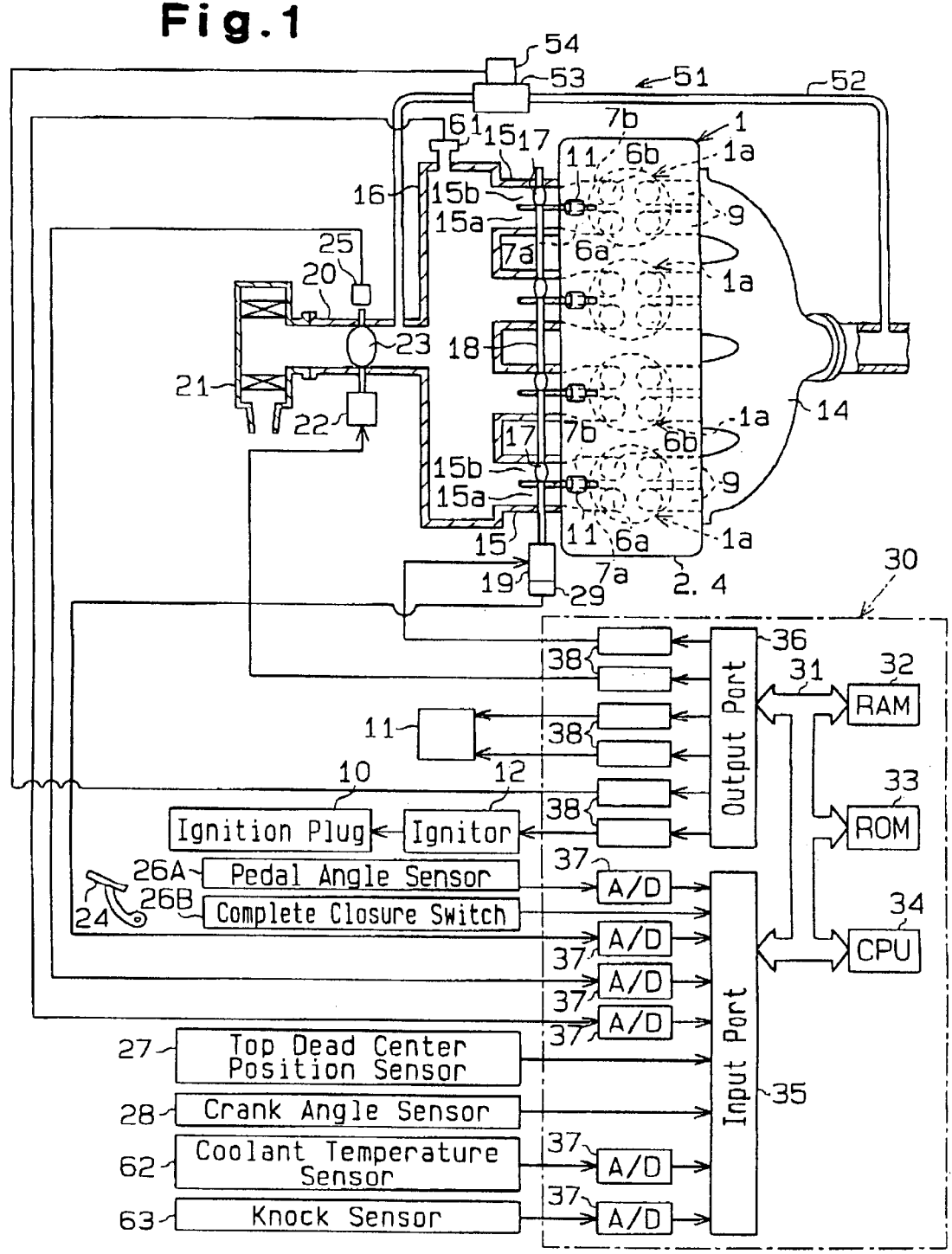
FIG. 1 is a schematic structural diagram illustrating an engine torque fluctuation reducing apparatus according to a first embodiment.
Figure 2:
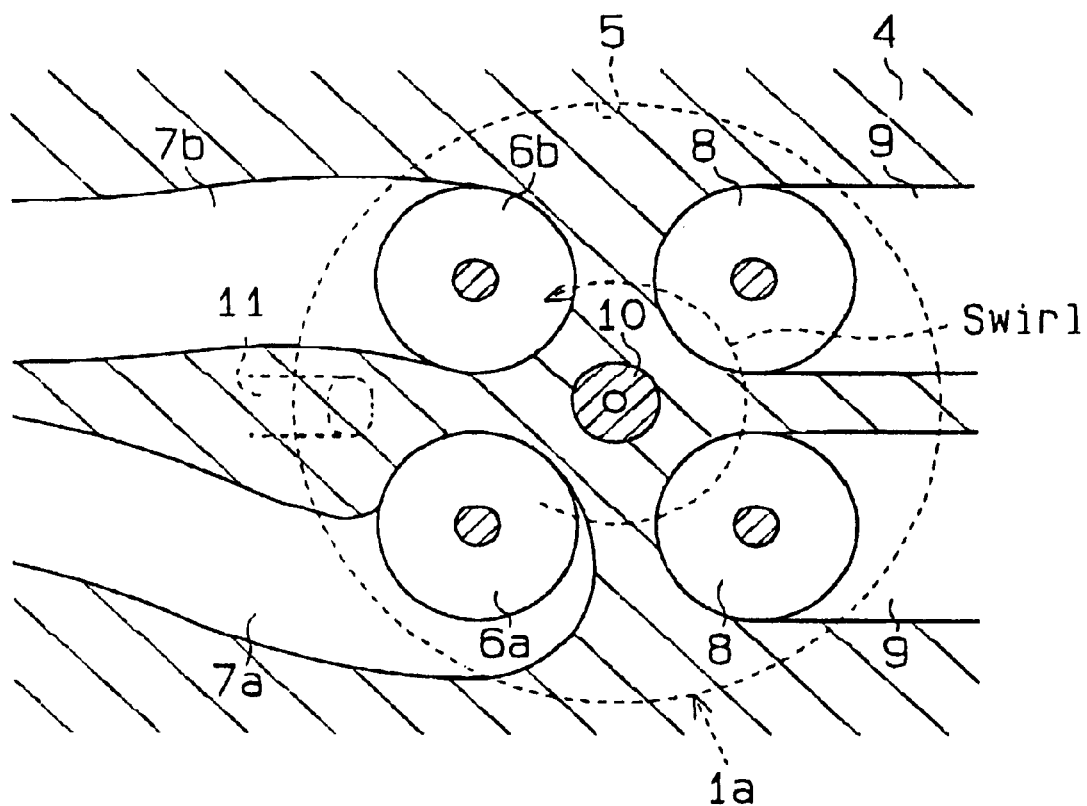
FIG. 2 is a schematic cross-sectional view showing one cylinder of an engine.

As shown in FIG. 1, an engine 1 is provided with four cylinders 1a. The structure of the combustion chamber of each cylinder 1a is shown in FIG. 2. The engine 1 has a cylinder block 2 that accommodates pistons. The pistons are reciprocated in the cylinders 1a of the cylinder block 2. A cylinder head 4 is arranged on top of the cylinder block 2. A combustion chamber 5 is defined between each piston and the cylinder head 4. Four valves are provided for each cylinder 1a. The four valves include a first intake valve 6a, a second intake valve 6b, and two exhaust valves 8. The first intake valve 6a regulates a first intake port 7a while the second intake valve 6b regulates a second intake port 7b. Each exhaust valve 8 is locates in an exhaust port 9.

As shown in FIG. 2, the first intake port 7a is a helical port that extends in a helical manner. The second intake port 7b extends in a generally straight manner. Ignition plugs 10 are arranged at the middle of the cylinder head 4 to face the combustion chambers 5. High voltage is applied to each ignition plug 10 by an ignitor 12 through a distributor (not shown). The ignition timing of the ignition plugs 10 is determined by the output timing of the high voltage sent from the ignitor 12. A fuel injection valve 11 is arranged near the inner wall of the cylinder head 4 in the vicinity of each set of first and second intake valves 6a, 6b in each combustion chamber 5. The fuel injection valve 11 injects fuel directly into the associated combustion chamber 5 of cylinder 1a.

In this embodiment, each injection valve 11 directly injects fuel into the associated cylinder 1a when either stratified charge combustion or homogeneous charge combustion is performed. When stratified charge combustion is performed, the valve 11 injects fuel into the combustion chamber 5 at the final stage of each compression stroke. The injected fuel is supplied in a concentrated manner about the ignition plug 10 and is burned. During stratified combustion, a throttle valve 23, which will be discussed below, is relatively open. When homogeneous charge combustion is performed, on the other hand, the valve 11 injects fuel into the combustion chamber 5 during the intake stroke of the associated piston. The injected fuel is mixed with air introduced into the combustion chamber 5 from the intake ports 7a, 7b and is burned.

As shown in FIG. 1, the first and second intake ports 7a, 7b of each cylinder 1a are connected to a surge tank 16 by a first intake passage 15a and a second intake passage 15b, which are defined in an intake manifold 15. A swirl control valve 17 is arranged in each second intake passage 15b. The swirl control valves 17 are connected to, for example, a step motor (or a DC motor) 19 by a common shaft 18. The step motor 19 is controlled by signals sent from an electronic control unit (ECU) 30, which will be discussed later. The step motor 19 may be replaced with an actuating member controlled by the vacuum pressure in the intake ports 7a, 7b.

The surge tank 16 is connected to an air cleaner 21 through an intake duct 20. A throttle valve 23, which is opened and closed by a step motor (or a DC motor) 22, is arranged in the intake duct 20. The ECU 30 sends signals to drive the step motor 22 for opening and closing the throttle valve 23. The throttle valve 23 adjusts the amount of intake air that passes through the intake duct 20 and enters the combustion chambers 5. In this embodiment, the intake duct 20, the surge tank 16, the first intake passage 15a and the second intake passage 15b constitute an intake path. A throttle sensor 25 is arranged in the vicinity of the throttle valve 23 to detect the opening angle (throttle angle TA) of the valve 23.

The exhaust ports 9 of each cylinder 1a are connected to an exhaust manifold 14. After combustion, the exhaust gas is sent to an exhaust pipe (not shown) through the exhaust manifold 14.

The engine 1 is provided with a conventional exhaust gas recirculation (EGR) mechanism 51 that includes an EGR passage 52 and an EGR valve 53 arranged in the EGR passage 52. The EGR passage 52 communicates a part of the intake duct 20 at the downstream side of the throttle valve 23 with an exhaust duct connected to the exhaust manifold 14. The EGR valve 53 includes a valve seat, a valve body (neither illustrated), and a step motor 54. The opening area of the EGR valve 53 is altered by causing the step motor 54 to intermittently displace the valve body with respect to the valve seat. When the EGR valve 53 opens, some of the exhaust gas sent into the exhaust duct enters the EGR passage 52. The gas is then drawn into the intake duct 20 via the EGR valve 53. In other words, some of the exhaust gas is recirculated by the EGR mechanism 51 and returned to the air-fuel mixture. The EGR valve 53 controls the recirculation amount of the exhaust gas.

The ECU 30 is a digital computer provided with a random access memory (RAM) 32, a read only memory (ROM) 33, a central processing unit (CPU) 34, which is a microprocessor, an input port 35 and an output port 36. A bidirectional bus 31 connects the RAM 32, the ROM 33, the CPU 34, the input port 35, and the output port 36 to one another.

An acceleration pedal 24 is connected to a pedal angle sensor 26A. The pedal angle sensor 26A generates voltage proportional to the degree of depression of the acceleration pedal 24. This enables the acceleration pedal depression amount to be detected. The voltage produced by the pedal angle sensor 26A is input in the CPU 34 by way of an analog-to-digital (A/D) converter 37 and the input port 35. The acceleration pedal 24 is also provided with a complete closure switch 26B, which detects whether the acceleration pedal 24 is not pressed at all The closure switch 26B outputs one as a complete closure signal when the acceleration pedal 24 is not pressed at all and outputs zero when the acceleration pedal 24 is pressed. The output voltage of the closure switch 26B is input to the CPU 34 via the input port 35.

A top dead center position sensor 27 generates an output pulse when, for example, the piston in the first cylinder 1a reaches the top dead center position. The output pulse is delivered to the CPU 34 via the input port 35. A crank angle sensor 28 generates an output pulse each time a crankshaft of the engine 1 is rotated, for example, by a crank angle CA of 30 degrees. The output pulse sent from the crank angle sensor 28 is sent to the CPU 34 via the input port 35. The CPU 34 reads the output pulses of the top dead center position sensor 27 and the crank angle sensor 28 to compute the engine speed NE.

The rotational angle of the shaft 18 is detected by a swirl control valve sensor 29 to measure the opening area of the swirl control valves 17. The signal output of the swirl control valve sensor 29 is sent to the CPU 34 via an A/D convertor 37 and tho input port 35. The throttle sensor 25 detects the throttle angle TA. The signal output of the throttle sensor 25 is sent to the CPU 34 via an A/D converter 37 and the input port 35.

An intake pressure sensor 61 is provided to detect the pressure in the surge tank 16 (intake pressure PIM). A coolant temperature sensor 62 is provided to detect the temperature of the engine coolant (coolant temperature THW). The sensors 61, 62 output signals based on detected values to the CPU 34 by way of corresponding A/D convertors 37 and the input port 35.

The cylinder block 2 is provided with a knock sensor 63, which detects the vibration that includes knocking generated by the engine 1 and outputs a knock signal KCS according to the frequency and the level of the vibration.

The sensors 25–29, 61–63 and the switch 26B serve as devices for detecting the running condition of the engine 1.

The output port 36 is connected to the fuel injection valves 11, the step motors 19, 22, the ignition plug 10 (ignitor 12), and the EGR valve 53 (the step motor 54) by way of drive circuits 38. The ECU 30 optimally controls the fuel injection valves 11, the step motors 19, 22, 54, and the ignitor 12 with control programs stored in the ROM 33 based on signals sent from the sensors 25–29, 61–63 and the switch 26B.

A program associated with various controls will now be discussed with reference to FIGS. 3, 4(a), and 4(b).

Figure 3:
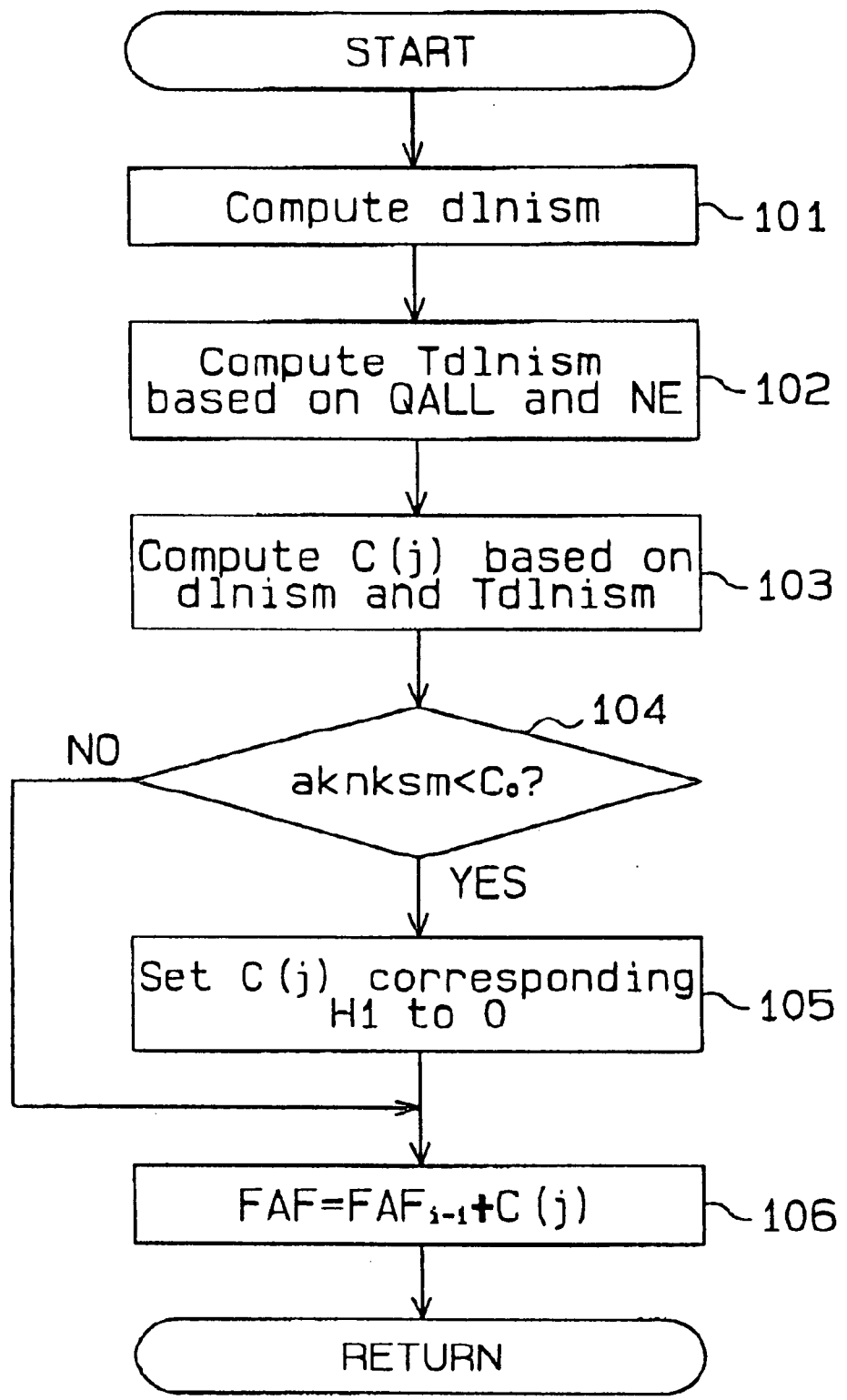
FIG. 3 is a flowchart illustrating a "feedback compensation coefficient computing routine," which is executed by an ECU.

To control the amount of fuel injection by regulating the fuel injection valve 11 upon the torque fluctuation, the ECU 30 executes the routine illustrated in FIG. 3 by an interrupt for each predetermined crank angle.

First, the ECU 30 computes a torque fluctuation dlnism in step 101. The ECU 30 computes a change in the angular velocity of the crankshaft (a change in the engine speed) as the torque fluctuation dlnism based on the output signal of the crank angle sensor 28 which is sent out every predetermined crank angle (30° CA).

Next, the ECU 30 computes a target torque fluctuation Tdlnism based on predetermined function data in step 102. This function data has previously been determined using a basic fuel injection amount QALL, the engine speed NE and the target torque fluctuation Tdlnism as parameters. The basic fuel injection amount QALL is previously been computed in a separate routine based on the acceleration pedal angle ACCP and the engine speed NE. The target torque fluctuation Tdlnism is a torque fluctuation that is allowed under the prevailing the running conditions of the engine 1. With a given engine speed NE and a given engine load, for instance, the target torque fluctuation Tdlnism is determined according to the air-fuel ratio A/F. As the air-fuel ratio A/F increases (as the mixture of fuel and air is leaner), the target torque fluctuation Tdlnism increases.

In step 103, the ECU 30, computes a feedback amount C(j), which affects the fuel injection amount, based on the torque fluctuations dlnism, the target torque fluctuation Tdlnism. More specifically, first, the ECU 30 selects one feedback amount function from several possible feedback amount functions based on the target torque fluctuation Tdlnism. Two graphs of such functions are given as FIG. 4(a) and 4(b). The horizontal axes indicate the difference between the torque fluctuation dlnism and the target torque fluctuation TDLNISM (dlnism-Tdlnism), and the vertical axes indicate C(j). The horizontal axes each include eight ranges L4, L3, L2, L1, H1, H2, H3, H4.

Figure 4A:
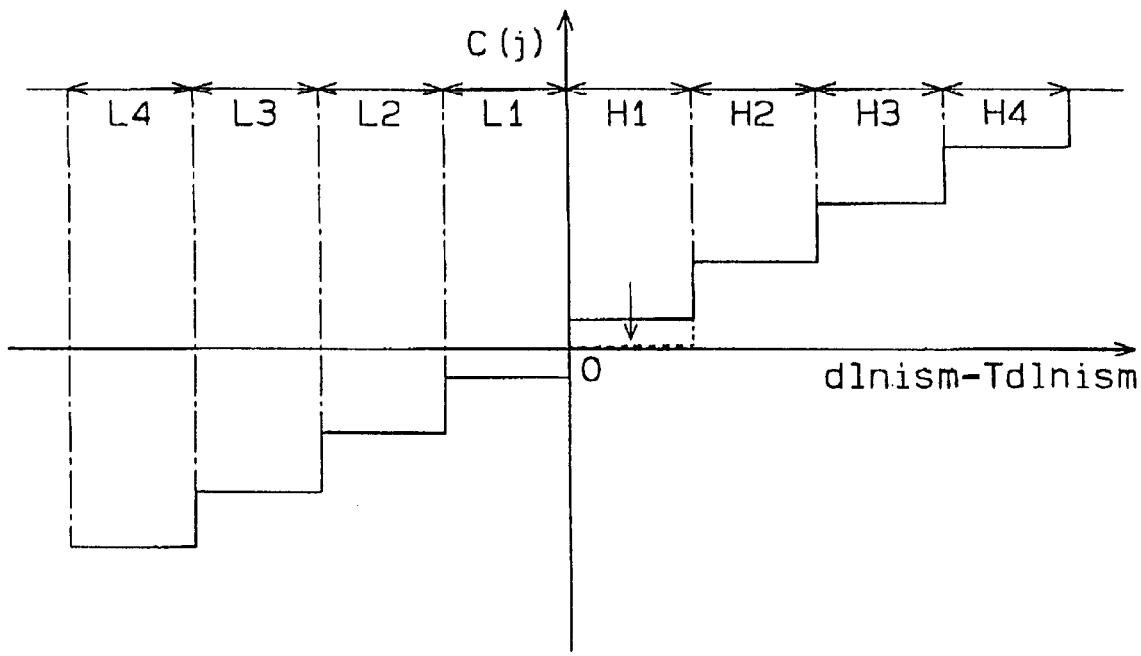
FIG. 4(a) is a graph showing the relationship between a torque fluctuation and a feedback amount.
Figure 4B:
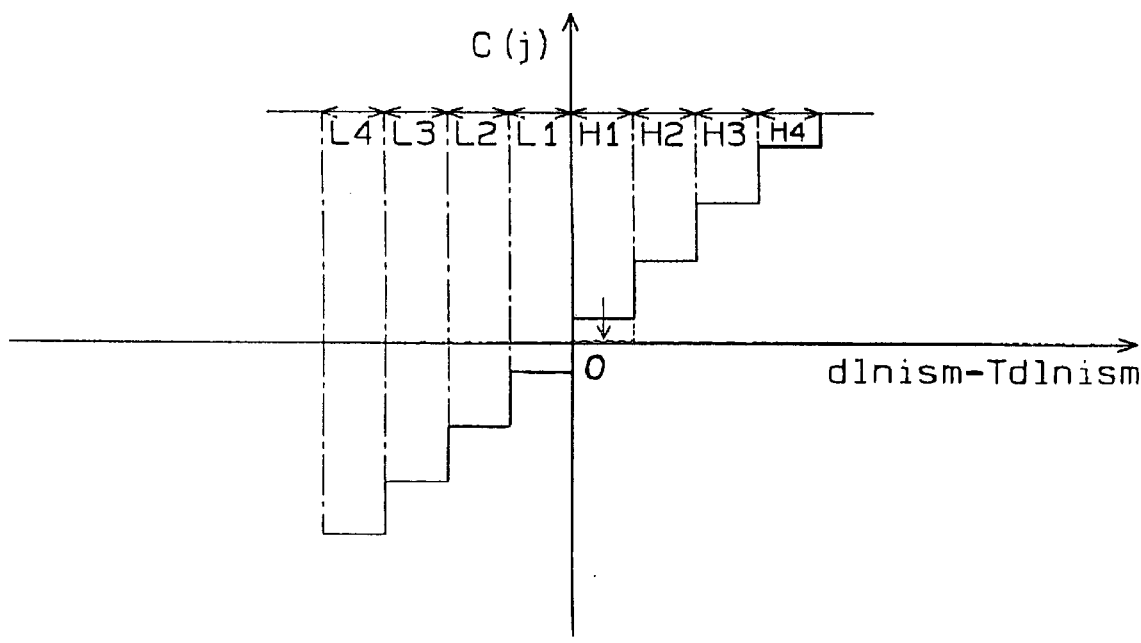
FIG. 4(b) is a graph showing the relationship between the torque fluctuation and the feedback amount.

In FIG. 4(a), each of the ranges L4–L1 and H1–H4 has a maximum width, while each of the ranges L4–L1 and H1–H4 of the graph of FIG. 4(b) has a minimum width. A number of other similar functions that are between these two extremes are also employed. In other words, further function graphs that have ranges L4–L1 and H1–H4 that are between those of FIGS. 4(a) and 4(b) in width, are employed such that the width of their ranges L4–L1 and H1–H4 increase stepwise between that indicated in FIG. 4(b) and that indicated in FIG. 4(a). When the computed target torque fluctuation Tdlnism is high, or near the maximum expected value, the ECU 30 selects the function represented by the graph of FIG. 4(a), and when the computed target torque fluctuation Tdlnism is low, or near the minimum expected value, the ECU 30 selects the function represented by the graph of FIG. 4(b). For values of the target torque fluctuation Tdlnism that are in between the maximum and minimum values, the ECU 30 proportionally selects one of the unillustrated functions that lie between the illustrated extremes.

In this embodiment, the feedback amount C(j) increases in reverse order for the ranges L1–L4 and in order for ranges H1–H4. The ECU 30 computes the feedback amount C(j) according to the difference between the torque fluctuation dlnism and the target torque fluctuation Tdlnlsm. When the difference between the torque fluctuation dlnism and tho target torque fluctuation Tdlnism lies in any of the ranges L4–L1, the feedback amount C(j) for regulating, the fuel injection amount takes a negative value. Optionally, the feedback amounts C(j) in the ranges L4–L1 may all be zero. When the torque fluctuation dlnism lies in any of the ranges H1–H4, the feedback amount C(j) takes appositive value.

In the subsequent step 104, the ECU 30 determines whether an ignition timing delay amount aknksm is smaller than a preset reference value (the limit value of the ignition timing delay amount) $C_0$. In other words, the ECU 30 determines if the ignition timing is over-delayed. A positive result in step 104 indicates an over-delay.

The ignition timing delay amount aknksm is computed in a separate routine in accordance with the level, frequency and the like of knocking, which is detected by the knock sensor 63. More specifically, the more knocking occurs, the more negative the ignition timing delay value aknksm is. In other words, a greater absolute value of aknksm represents a greater timing delay. When no knocking occurs, the ignition timing delay amount aknksm is set to zero. The ignition timing delay amount aknksm, set in this manner, is used in computing the ignition timing T. Specifically, to determine the ignition timing T, the ECU 30 computes a basic ignition timing T0 based on the set basic fuel injection amount QALL and engine speed NE and adds the ignition timing delay amount aknksm to this basic ignition timing T0.

When the ignition timing delay amount aknksm is smaller than the reference value $C_0$, the ECU 30 proceeds to step 105. In this step 105, the ECU 30 sets the feedback amount C(j) for the range H1 to zero as indicated by the arrows in FIGS. 4(a) and 4(b). When the ignition timing delay amount aknksm is equal to or larger than the reference value $C_0$ in step 104, the ECU 30 proceeds to step 106.

In step 106, which is reached from step 104 or 105, the ECU 30 calculates a feedback compensation coefficient FAF associated with the fuel injection amount based on the computed feedback amount C(j) for the fuel injection amount. That is, the ECU 30 adds the feedback amount C(j) to a previous feedback compensation coefficient $FAF_{i-1}$ to obtain a new feedback compensation coefficient FAF.

Then, the ECU 30 temporarily terminates the subsequent processing. The currently computed feedback compensation coefficient FAF is used together with the basic fuel injection amount QALL in computing the final fuel injection amount in a fuel injection control program routine.

The operation of the torque fluctuation reducing apparatus according to this embodiment will be discussed below.

In the above-described embodiment, the basic fuel injection amount QALL is calculated in a separate routine on the basis of the acceleration pedal angle ACCP and the engine speed NE. In the routine in FIG. 3, the ECU 30 compensates the fuel injection amount to steer the actual torque fluctuation dlnism towards the target torque fluctuation Tdlnism. Specifically, the amount of fuel is increased to reduce the torque fluctuation dlnism.

When knocking occurs, to reduce the knocking, the ignition timing delay amount aknksm, which is calculated in a separate program routine, is decreased to reduce the knocking. That is, the ignition timing is delayed. When the ignition timing delay amount aknksm is smaller than the reference value $C_0$, or when the ignition timing delay is increased to a certain degree, the feedback amount C(j) for the range H1 shown in FIGS. 4A and 4B is reset to zero from a positive value as indicated by the arrows in FIGS. 4(a) and 4(b). When tho torque fluctuation dlnism is large enough to lie in the range H1, this setting limits a further increase in the basic fuel injection amount QALL. This restriction on the fuel increase prevents the combustion speed from increasing and prevents knocking from occurring due to an excessive increase in the fuel injection amount.

In this embodiment, the suppression of knocking is given priority over the reduction of the torque fluctuation dlnism by restricting an increase in the fuel injection amount. This prevents the fuel injection amount from increasing in order to reduce the torque fluctuation dlnism and thus prevents an undesirable increase in the ignition timing delay. That is, over-delay is prevented. This prevents misfires due to timing over-delay. This prevents the circular problem resulting from the repeated suppression of knocking and reduction of the torque fluctuation dlnism described in the Background of the Invention.

Second Embodiment

A second embodiment of this invention will now be described.

To avoid a redundant description, like or same reference numerals are given to those components that are the same as the corresponding components of the first embodiment.

According to this embodiment, when the ignition timing delay amount aknksm is increased to suppress knocking, the amount of the exhaust gas recirculation is compensated in accordance with the engine speed NE. The ECU 30 executes a routine represented by the flowchart in FIG. 5 by an, interrupt for each predetermined crank angle to perform the compensation.

First, the ECU 30 computes the engine speed NE from the output signal or the crank angle sensor 28 or the like in step 201. Then, the ECU 30 determines that the engine speed NE is greater than a preset reference value $NE_o$. When it is determined, the ECU 30 goes to step 202.

In step 202, based on the output signal of the knock sensor 63, the ECU 30 determines whether there is knocking. When knocking occurs, the ECU 30 proceeds to step 204.

Figure 6:
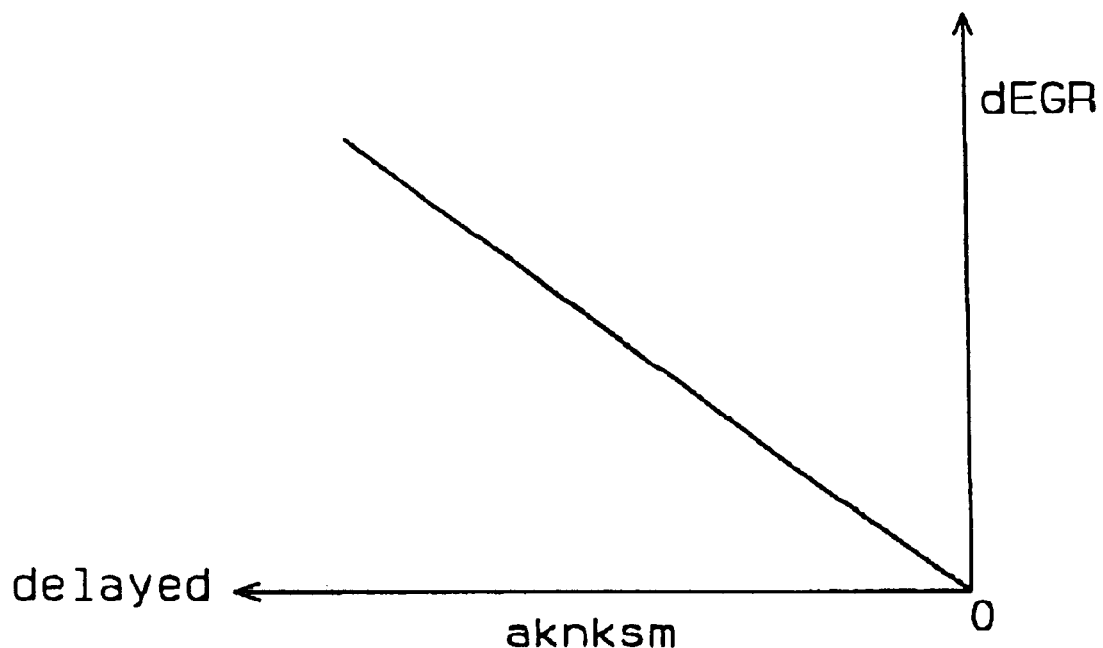
FIG. 6 is a graph showing the relationship between the amount of delay of the ignition timing and the amount of compensation of the exhaust gas recirculation.

In step 204, the ECU 30 reads the ignition timing delay amount aknksm, separately computed in a routine similar to the one discussed with regard to the first embodiment. Then, the ECU 30 calculates an EGR compensation amount dEGR based on the ignition timing delay amount aknksm. As shown in FIG. 6, the EGR compensation amount dEGR. In other words, higher values of the absolute value of the delay amount (greater timing delays) correspond to greater EGR compensation values.

When there is no knocking detected in step 202, the ECU 30 proceeds to step 205 to set the EGR compensation amount dEGR to zero. When the engine speed NE is equal to or smaller than the reference value $NE_o$ in the previous step 201, the ECU 30 goes to step 203 to set the EGR compensation amount dEGR to zero as in the step 205.

In step 206, which is reached from step 203, 204 or 205, the ECU 30 subtracts the EGR compensation amount dEGR from a basic EGR amount $EGR_0$ as an EGR amount EGRF. The basic, EGR amount $EGR_0$ is computed based on the acceleration pedal angle ACCP or the like in a separate routine. Then, the ECU 30 temporarily terminates the subsequent processing.

In this routine, as apparent from the above, the reference EGR amount $EGR_o$ is reduced by the EGR compensation amount dEGR.

The operation of the fluctuation reducing apparatus according to this embodiment will be discussed below.

At times, recirculation of exhaust gas to the intake air reduces the combustion speed and suppresses knocking. When the engine speed NE is high and the temperature of the exhaust gas is higher than a certain level, however, the recirculation of the exhaust gas to the intake air raises the intake temperature. The rise of the intake temperature increases the combustion speed. As the combustion speed increases, knocking becomes worse.

According to this embodiment, when and only when the engine speed NE exceeds a predetermined value $NE_o$ and there is knocking, the EGR compensation amount dEGR is set to a positive value based on the ignition timing delay amount aknksm that has been computed separately. The EGR amount EGRF is therefore reduced by the EGR compensation amount dEGR. The decrease in the EGR amount EGRF suppresses knocking.

Generally, as the EGR amount EGRF is reduced, undesired exhaust emissions are increased. According to this embodiment, however, reduction of the EGR amount $EGR_0$ by the EGR compensation amount dEGR is carried out only when knocking occurs at high engine speeds, and the EGR compensation amount dEGR is set based on the ignition timing delay amount aknksm according to the degree of that knocking. In this manner, a reduction in the EGR amount EGRF is minimized in accordance with the degree of knocking. This prevents the EGR amount EGRF from being reduced more than necessary, so that undesired exhaust emissions will not increase more than necessary.

Further, since knocking is suppressed by a reduction in the EGR amount EGRF at high engine speeds, the ignition timing delay amount aknksm will not be increased more than necessary. This prevents an increase in the torque fluctuation and the delay of the ignition timing. Furthermore, the circular problem caused by the repeated suppression of knocking and reduction of the torque fluctuation is prevented.

It should be apparent to those skilled in the art that the present invention may be embodied in many other specific forms without departing from the spirit or scope of tho invention. Particularly, it should be understood that the invention may be embodied in the following forms:

(a) Instead of using the angular velocity of the crankshaft, or a change in the engine speed NE, the torque fluctuation dlnism may be computed based on other parameters indicating the torque fluctuation of the engine, such as a fluctuation in combustion pressure.

Figure 5:
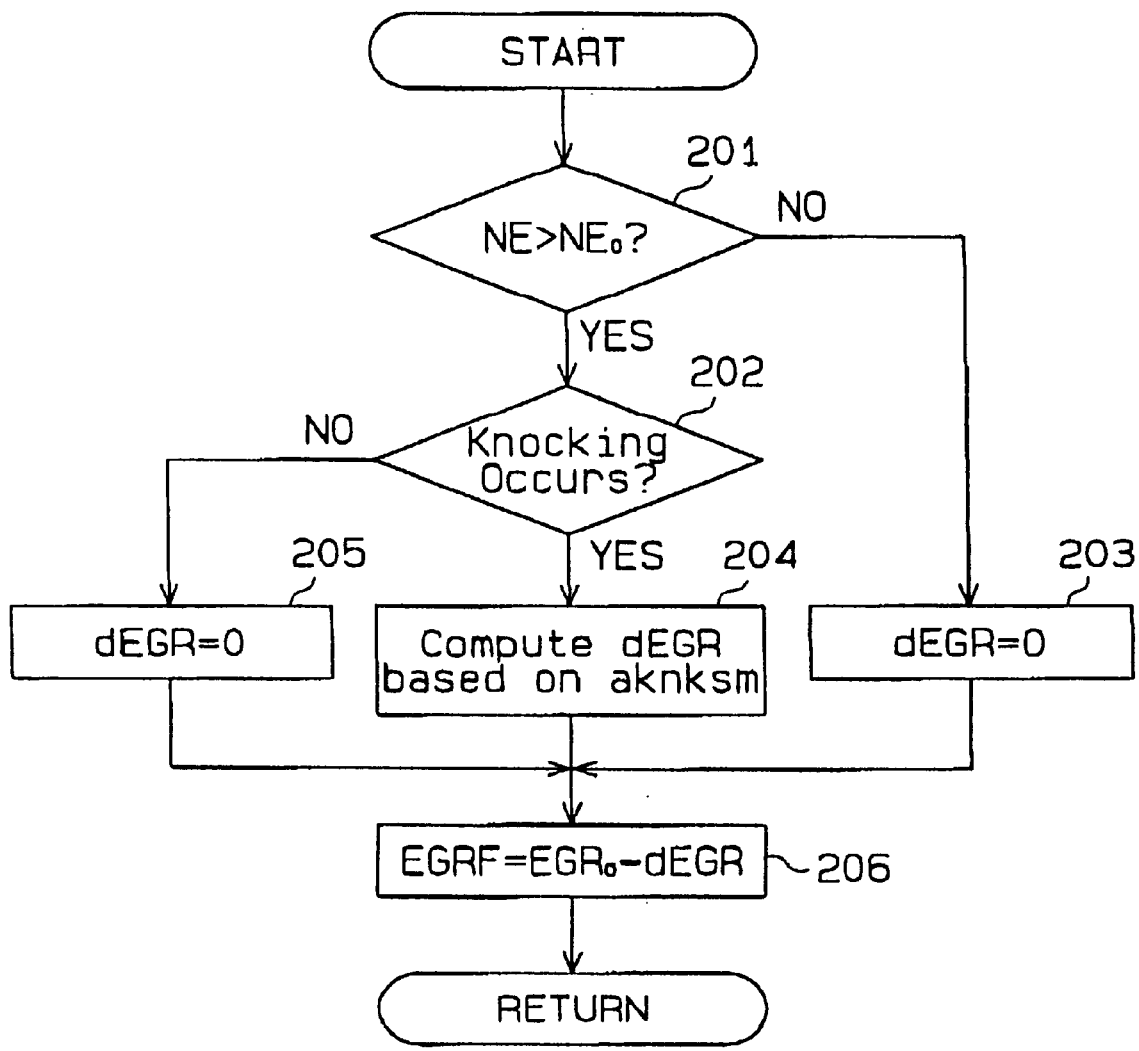
FIG. 5 is a flowchart illustrating an "exhaust gas recirculation amount compensation control routine" which is executed by the ECU.

(b) In step 201 in FIG. 5, parameters other than the engine speed NE, such as the acceleration pedal angle and the fuel injection amount, may be used as long as they can indicate a change in the temperature of the exhaust gas.

(c) Although the electronically controllable throttle valve 23 is used in the above-described embodiments, a mechanical throttle valve, which is linked to the acceleration pedal 24, may be used instead.

(d) The fuel injection amount and the EGR amount may both be compensated.

(e) According to the first and second embodiments, the present invention is employed in a cylinder injection type engine 1. However, the present invention may be employed in any type of engine as long as the engine is able to perform lean burn combustion. For example, the present invention may be employed in an engine in which fuel is injected toward the back faces of the intake valves 6a, 6b for performing stratified charge combustion. Further, in the illustrated embodiment, the fuel injection valve 11 is provided in the vicinity of the intake valves 6a, 6b. However, the valve 11 may be located at any position as long as the valve 11 can directly inject fuel into the combustion chamber 5.

(f) The engine 1 according to the first embodiment includes helical intake ports 7a, 7b, which generate a swirl of intake air. However, a swirl is not required. Therefore, the swirl control valve 17 and the step motor 19 may be omitted.

(g) The first and second embodiments are employed in a gasoline engine 1. However the present invention may be embodied in a diesel engine.

Therefore, the present examples and embodiments are to be considered as illustrative and not restrictive and the invention is not to be limited to the details given herein, but may be modified within the scope and equivalence of the appended claims.

What is claimed is:

1. An apparatus for reducing a torque fluctuation of a lean burn combustion engine, comprising:

an injector for supplying fuel to combustion chambers of said engine;

an ignitor for igniting said fuel supplied into said combustion chambers;

a knock detector for detecting knocking in said engine;

an ignition timing controller for computing a delay amount of the ignition timing based on a result of knock detection by the knock detector and for controlling the ignitor to delay the ignition timing by said delay amount to suppress knocking;

a torque fluctuation detector for detecting torque fluctuation of said engine;

a fuel injection controller for increasing an amount of fuel injection from said injector by an increase amount to reduce said torque fluctuation when the detected torque fluctuation is larger than a target value; and a limit device for limiting the increase amount when said ignition timing is delayed by more than a predetermined delay amount.

2. The apparatus according to claim 1, wherein the limit device sets the increase amount to zero.

3. The apparatus according to claim 1, wherein said torque fluctuation ranges between negative and positive values, and when said torque fluctuation takes a positive value, the increase amount has a corresponding positive value, and, in general, the increase amount increases as the torque fluctuation increases.

4. The apparatus according to claim 3, wherein the range of said torque fluctuation is separated into a plurality of sub-ranges, and wherein each sub-range corresponds in a stepwise manner to a single increase amount.

5. The apparatus according to claim 4, wherein the limit device limits the increase amount when said torque fluctuation lies in a positive sub-range that is closer to zero than the remaining sub-ranges.

6. The apparatus according to claim 5, further comprising:

a condition detector for detecting a running condition of said engine;

a target value computer for computing a target value of said torque fluctuation, wherein the target value is selected in accordance with the detected running condition; and a function selector for selecting an appropriate relationship between said torque fluctuation and the increase amount based on said computed target value.

7. The apparatus according to claim 6, wherein the function selector selects a function having relatively wide sub-ranges when the target value is relatively high and selects a function having relatively narrow sub-ranges when the target value is relatively low.

8. An apparatus for reducing a torque fluctuation of a lean burn combustion engine, comprising:

an injector for supplying fuel to combustion chambers of said engine;

an ignitor for igniting said fuel supplied into said combustion chambers;

a knock detector for detecting knocking in said engine;

an ignition timing controller for computing a delay amount of the ignition timing based on a result of knock detection by the knock detector and for controlling the ignitor to delay the ignition timing by said delay amount to suppress knocking;

a condition detector for detecting a running condition of said engine;

a target value computer for computing a target value of said torque fluctuation, wherein the target value is selected in accordance with the detected running condition;

a torque fluctuation detector for detecting torque fluctuation of said engine;

a function selector for selecting an appropriate relationship between said torque fluctuation and the increase amount based on said computed target value;

a fuel injection controller for increasing an amount of fuel injection from said injector by an increase amount to reduce said torque fluctuation when the detected torque fluctuation is larger than a target value; and a limit device for limiting the increase amount when said ignition timing is delayed by more than a predetermined delay amount.

9. The apparatus according to claim 8, wherein the range of said torque fluctuation is separated into a plurality of sub-ranges, and wherein each sub-range corresponds in a stepwise manner to a single increase amount.

10. The apparatus according to claim 9, wherein the limit device limits the increase amount when said torque fluctuation lies in a positive sub-range that is closer to zero than the remaining sub-ranges.

11. The apparatus according to claim 10, wherein the function selector selects a function having relatively wide sub-ranges when the target value is relatively high and selects a function having relatively narrow sub-ranges when the target value is relatively low.

12. An apparatus for reducing a torque fluctuation of an internal combustion engine which performs lean burn combustion, comprising:

an exhaust gas recirculating mechanism for recirculating a gas into an intake passage from an exhaust passage of said engine, said mechanism including an exhaust gas recirculating passage for connecting said exhaust passage of said engine to said intake passage, a valve disposed in said exhaust gas recirculating passage, and an actuator for opening and closing said valve;

a condition detector for detecting a running condition of said engine;

a recirculation computer for computing an amount of exhaust gas recirculation based on said detected running condition, and controlling said actuator based on said amount of exhaust gas recirculation;

an ignitor for igniting said fuel supplied into combustion chambers of said engine;

a knock detector for detecting knocking in said engine;

an ignition timing controller for computing a delay amount of the ignition timing based on a result of knock detection by the knock detector and for controlling the ignitor to delay the ignition timing by said delay amount to suppress knocking; and a compensation controller for reducing said amount of exhaust gas recirculation in accordance with said computed delay amount, wherein said condition detector includes a sensor for detecting a number of rotations of said engine, and said compensation controller compensates said amount of exhaust gas recirculation when the number of rotations of said engine exceeds a predetermined reference value.

13. The apparatus according to claim 12, wherein said compensation controller reduces said amount of exhaust gas recirculation more as said ignition timing is delayed.

14. A method of reducing the torque fluctuation of a lean-burn internal combustion engine, comprising the steps of:

detecting whether knocking has occurred in said engine;

detecting the torque fluctuation of said engine;

increasing an amount of fuel injection by an increase amount to reduce the torque fluctuation when the detected torque fluctuation is larger than a target value;

delaying the ignition timing based on the outcome of the knock detection step; and limiting the increase amount when said ignition timing is delayed more than a predetermined delay amount.

15. The method according to claim 14, wherein the limiting step includes setting the increasing amount to zero when the ignition timing is delayed by the predetermined delayed amount.

16. The method according to claim 15, wherein the step of increasing the amount of fuel injection includes a step of increasing the increasing amount as the torque fluctuation of the engine increases.

17. A method of reducing the torque fluctuation of a lean-burn internal combustion engine, the method comprising the steps of:

detecting a running condition of the engine;

computing a target amount of exhaust gas recirculation based on the detected running condition;

controlling the amount of exhaust gas recirculation based on the target amount;

detecting whether knocking has occurred in the engine;

computing a delay amount for delaying the ignition timing of the engine based on the outcome of the knock detection step;

delaying the ignition timing by the delay amount;

detecting a number of rotations of the engine per unit time; and reducing the amount of exhaust gas recirculation in accordance with the delay amount, wherein the step of reducing the amount of exhaust gas recirculation is performed when the number of rotations of the engine per unit time exceeds a predetermined reference value.

18. The method according to claim 17, wherein the step of reducing the amount of exhaust gas recirculation includes a step of further reducing the amount of exhaust gas recirculation as the ignition timing is further delayed.

* * * * *

UNITED STATES PATENT AND TRADEMARK OFFICE
CERTIFICATE OF CORRECTION

PATENT NO. : 6,041,755
DATED : March 28, 2000
INVENTOR(S) : Zenichiro MASHIKI

It is certified that error appears in the above-identified patent and that said Letters Patent is hereby corrected as shown below:

On the title page, item [73]:

Please correct Assignee to read: Toyota Jidosha Kabushiki Kaisha.

Signed and Sealed this

Thirteenth Day of February, 2001

Attest:

NICHOLAS P. GODICI

Attesting Officer

Acting Director of the United States Patent and Trademark Office